United States Patent
Nishimoto

(10) Patent No.: US 7,068,006 B2
(45) Date of Patent: Jun. 27, 2006

(54) STEPPING MOTOR CONTROL CIRCUIT

(75) Inventor: Masateru Nishimoto, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 6 days.

(21) Appl. No.: 10/913,983

(22) Filed: Aug. 5, 2004

(65) Prior Publication Data

US 2005/0046378 A1    Mar. 3, 2005

(30) Foreign Application Priority Data

| Aug. 25, 2003 | (JP) | ............................. 2003-299887 |
| Aug. 26, 2003 | (JP) | ............................. 2003-300704 |
| Aug. 28, 2003 | (JP) | ............................. 2003-304088 |

(51) Int. Cl.
  *H02P 8/22*   (2006.01)
  *B23Q 35/14*  (2006.01)

(52) U.S. Cl. ..................... 318/685; 318/162; 388/904

(58) Field of Classification Search ........ 318/162–164, 318/685, 696; 388/904
  See application file for complete search history.

(56) References Cited

U.S. PATENT DOCUMENTS

| 4,477,756 | A |   | 10/1984 | Moriguchi |
| 4,812,727 | A |   | 3/1989  | Sakai et al. |
| 4,833,372 | A | * | 5/1989  | Kobayashi et al. ......... 318/696 |
| 4,882,530 | A | * | 11/1989 | Kabune et al. ............. 318/696 |
| 4,920,420 | A |   | 4/1990  | Sano et al. |
| 5,040,234 | A | * | 8/1991  | Yamamoto et al. ......... 388/811 |
| 5,311,849 | A | * | 5/1994  | Lambert et al. ............ 123/337 |
| 5,574,351 | A | * | 11/1996 | Jacobson et al. ........... 318/696 |
| 5,893,651 | A |   | 4/1999  | Sakamoto |
| 5,956,528 | A | * | 9/1999  | Tanaka ........................ 396/52 |
| 5,977,739 | A | * | 11/1999 | Ohsawa ...................... 318/685 |

* cited by examiner

*Primary Examiner*—Bentsu Ro
(74) *Attorney, Agent, or Firm*—Frishauf, Holtz, Goodman & Chick, P.C.

(57) ABSTRACT

At the start of driving a stepping motor, a CPU sets the switching widths of the first through eighth states in a pulse width setting register, sets the switching counts of the first through eighth states in a pulse switching count register, and sets the start of driving the stepping motor in a driving start register. A latch then outputs an excitation pulse, and the stepping motor is accelerated, driven at a constant speed, decelerated, and stopped. By setting the switching widths and switching counts of the first through eighth states at the start of driving and setting the start of driving, the CPU need not control the stepping motor, reducing the process burden on the CPU.

14 Claims, 9 Drawing Sheets

FIG.6A     FIG.6B

STEPPING MOTOR CONTROL CIRCUIT

CROSS-REFERENCE TO RELATED APPLICATIONS

This application is based upon and claims the benefit of priority from prior Japanese Patent Applications No. 2003-300704, filed Aug. 26, 2003; and No. 2003-304088, filed Aug. 28, 2003, the entire contents of both of which are incorporated herein by reference.

BACKGROUND OF THE INVENTION

1. Field of the Invention

The present invention relates to a stepping motor control circuit which drives various objects, an electronic camera, and a stepping motor control method.

2. Description of the Related Art

A conventional stepping motor control circuit controls a stepping motor which drives the zoom lens of an electronic camera. The stepping motor control circuit comprises a system controller and zoom lens driving circuit. When the zoom switch is turned on, the system controller operates on the basis of a program, enters the zoom mode, and controls the zoom lens driving circuit to start pulse driving of the stepping motor. Subsequently, the system controller adds or subtracts an output driving pulse value P, stores the resultant pulse value P, and calculates zoom position data corresponding to the stored pulse value P. The system controller controls pulse driving of the stepping motor on the basis of the calculated zoom position data and zoom position data which is stored in the system controller in advance. The system controller compares the driving pulse value P with a pulse value corresponding to the original zoom position data which is stored in the system controller in advance. When these pulse values do not coincide with each other, the system controller corrects the zoom position data which is stored in the system controller in advance.

The stepping motor driving method includes a 1-1 phase driving method (excitation method) of sequentially exciting stators of four phases or the like phase by phase, a 1-2 phase driving method of alternately repeating one-phase driving (excitation) and two-phase driving, and a 2-2 phase driving method of driving stators for two phases. In practice, the one-phase driving method is rarely employed because of a small torque. The 1-2 phase driving method has an advantage of implementing smooth rotation, whereas the 2-2 phase driving method has an advantage of implementing stable rotation. To exploit these advantages in accordance with the driving form, there has been proposed a stepping motor driving method of selectively operating the stepping motor by the 1-2 phase driving method and 2-2 phase driving method.

BRIEF SUMMARY OF THE INVENTION

According to one aspect, a stepping motor control circuit is provided with a switching width memory which divides a driving process of a stepping motor into a plurality of driving states and stores switching widths of an excitation pulse that are set for the divided driving states, a switching count memory which stores switching counts of the excitation pulse that are set for the divided driving states, a pattern data memory which stores a plurality of pattern data of the excitation pulse, a selector which sequentially selects the pattern data stored in the pattern data memory, in response to a driving start instruction in accordance with the switching widths stored in the switching width memory and the switching counts stored in the switching count memory, and an output unit which outputs the excitation pulse to the stepping motor in accordance with the pattern data selected by the selector.

According to another aspect, a stepping motor control circuit is provided with a virtual value memory which stores a maximum value and a minimum value when a driving range of an object to be driven by a stepping motor is given by a virtual numerical value, a measurement unit which measures a virtual position of the object to be driven on the basis of a control content for outputting an excitation pulse to the stepping motor, a comparison unit which compares the virtual position of the object to be driven that is measured by the measurement unit with the maximum value and the minimum value that are stored in the virtual value memory, and an output stop control unit which stops output of the excitation pulse in accordance with a comparison result of the comparison unit.

According to still another aspect, a stepping motor control circuit is provided with a pattern data memory which stores a plurality of excitation pattern data capable of driving a stepping motor by different driving methods by intermittently selecting the excitation pattern data at different intervals, a selector which intermittently selects, at intervals corresponding to designated driving methods, the excitation pattern data stored in the pattern data memory, and an output unit which outputs an excitation pulse to the stepping motor in accordance with the excitation pattern data selected by the selector.

According to still another aspect, an electronic camera is provided with a lens system, a driving unit having a stepping motor which drives the lens system, an image sensing unit which senses an image formed by the lens system, a switching width memory which divides a driving process of the stepping motor into a plurality of driving states and stores switching widths of an excitation pulse that are set for the divided driving states, a switching count memory which stores switching counts of the excitation pulse that are set for the divided driving states, a pattern data memory which stores a plurality of pattern data of the excitation pulse, a selector which sequentially selects the pattern data stored in the pattern data memory, in response to a driving start instruction in accordance with the switching widths stored in the switching width memory and the switching counts stored in the switching count memory, and an output unit which outputs the excitation pulse to the stepping motor in accordance with the pattern data selected by the selector.

According to still another aspect, an electronic camera is provided with a lens system, a driving unit having a stepping motor which drives the lens system, an image sensing unit which senses an image formed by the lens system, a pattern data memory which stores a plurality of excitation pattern data capable of driving the stepping motor by different driving methods by intermittently selecting the excitation pattern data at different intervals, a selector which intermittently selects, at intervals corresponding to designated driving methods, the excitation pattern data stored in the pattern data memory, and an output unit which outputs an excitation pulse to the stepping motor in accordance with the excitation pattern data selected by the selector.

According to still another aspect, a stepping motor control circuit is provided with switching width storage means for dividing a driving process of a stepping motor into a plurality of driving states and storing switching widths of an excitation pulse that are set for the divided driving states, switching count storage means for storing switching counts of the excitation pulse that are set for the divided driving states, pattern data storage means for storing a plurality of pattern data of the excitation pulse, selection means for sequentially selecting the pattern data stored in the pattern data storage means, in response to a driving start instruction in accordance with the switching widths stored in the switching width storage means and the switching counts stored in the switching count storage means, and output means for outputting the excitation pulse to the stepping motor in accordance with the pattern data selected by the selection means.

According to still another aspect, a stepping motor control circuit is provided with virtual value storage means for storing a maximum value and a minimum value when a driving range of an object to be driven by a stepping motor is given by a virtual numerical value, measurement means for measuring a virtual position of the object to be driven on the basis of a control content for outputting an excitation pulse to the stepping motor, comparison means for comparing the virtual position of the object to be driven that is measured by the measurement means with the maximum value and the minimum value that are stored in the virtual value storage means, and output stop means for stopping output of the excitation pulse in accordance with a comparison result of the comparison means.

According to still another aspect, a stepping motor control circuit is provided with pattern data storage means for storing a plurality of excitation pattern data capable of driving a stepping motor by different driving methods by intermittently selecting the excitation pattern data at different intervals, selection means for intermittently selecting, at intervals corresponding to designated driving methods, the excitation pattern data stored in the pattern data storage means, and output means for outputting an excitation pulse to the stepping motor in accordance with the excitation pattern data selected by the selection means.

According to still another aspect, there is provided a stepping motor control method comprising steps of dividing a driving process of a stepping motor into a plurality of driving states to store, in a memory, switching widths of an excitation pulse that are set for the divided driving states, storing, in a memory, switching counts of the excitation pulse that are set for the divided driving states, sequentially selecting the pattern data stored in a pattern data memory which stores a plurality of pattern data of the excitation pulse, in response to a driving start instruction in accordance with the switching widths and the switching counts which are stored in the memories, and outputting the excitation pulse to the stepping motor in accordance with the selected pattern data.

According to still another aspect, there is provided a stepping motor control method comprising steps of intermittently selecting excitation pattern data at intervals corresponding to designated driving methods from a pattern data memory which stores a plurality of excitation pattern data capable of driving a stepping motor by different driving methods by intermittently selecting the excitation pattern data at different intervals, and outputting an excitation pulse to the stepping motor in accordance with the selected excitation pattern data.

DETAILED DESCRIPTION OF THE INVENTION

Figure 1:
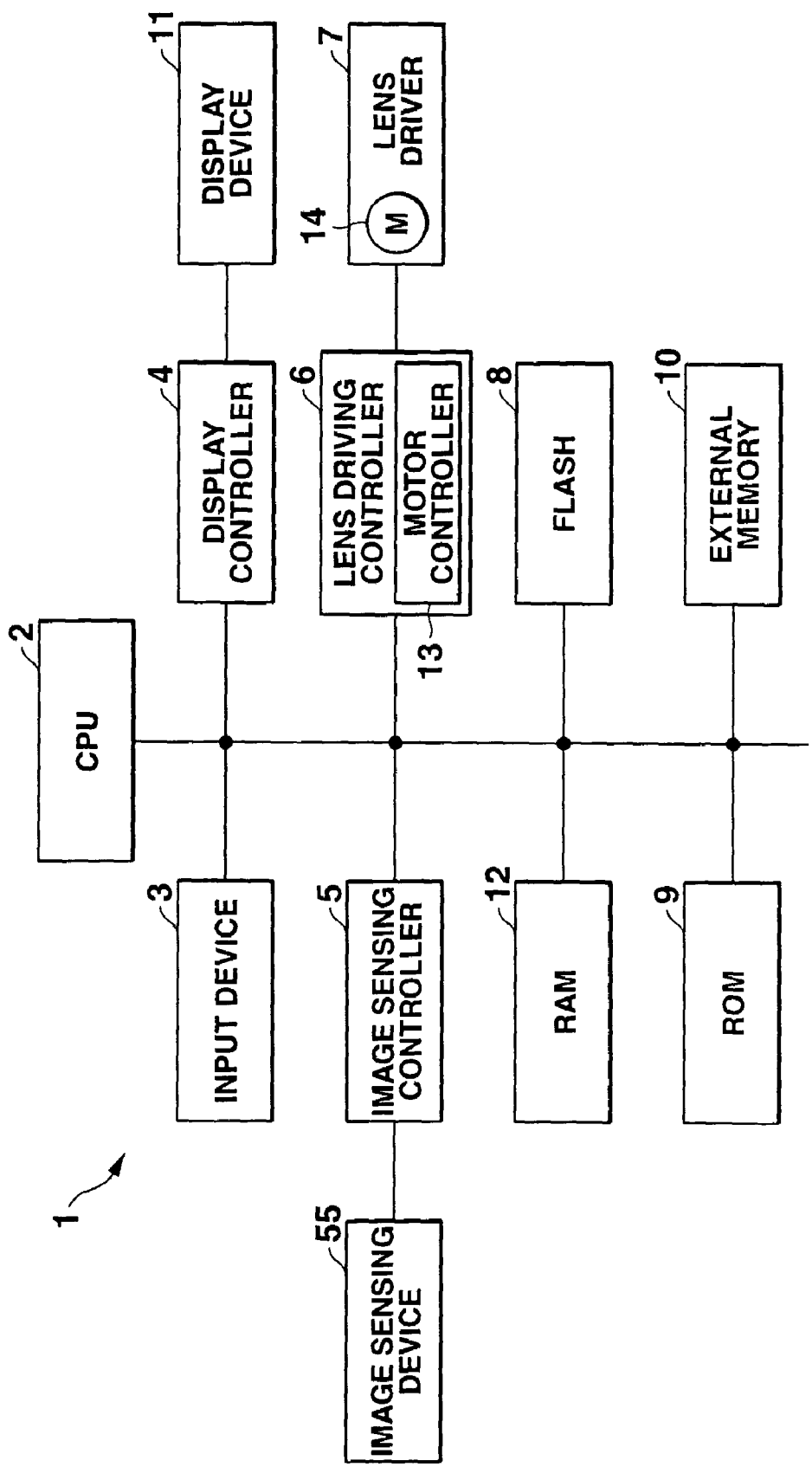
FIG. 1 is a block diagram showing the circuit configuration of a digital camera to which an embodiment of the present invention is applied.

An embodiment of the present invention will be described below with reference to the accompanying drawings. FIG. 1 is a block diagram showing the circuit configuration of a digital camera to which the embodiment of the present invention is applied. A digital camera 1 comprises a CPU 2, and the CPU 2 is connected to an input device 3, display controller 4, image sensing controller 5, lens driving controller 6, RAM 12, flash memory 8, ROM 9, and external memory 10.

The CPU 2 controls each unit on the basis of a program stored in the ROM 9. The input device 3 includes various operation keys such as a shutter key necessary for the digital camera, and sends an operation signal corresponding to key operation to the CPU 2. The display controller 4 controls the operation of a display device 11 formed from an LCD or the like under the control of the CPU 2. The image sensing controller 5 performs a process of converting an image sensing signal output from an image sensing device 55 formed from a CCD or the like into a digital signal and generating image data.

The lens driving controller 6 includes a motor controller 13 (to be described later), and the motor controller 13 outputs an excitation pulse. A lens driver 7 comprises a stepping motor 14 which drives the lens along the optical axis of the lens. An excitation pulse from the motor controller 13 is input to the stepping motor 14, and the stepping motor 14 then operates to drive the lens along the optical axis. In the embodiment, the stepping motor 14 has stators (0 through 3) of four phases (to be described later).

The RAM 12 temporarily stores programs and various data which are stored in the ROM 9, and is used as a work area for the CPU 2. The flash memory 8 stores image data obtained by image sensing when, for example, the external memory 10 is not mounted. The ROM 9 stores the programs and various data necessary for control. The external memory 10 is freely detachable, and stores image data captured along with the operation of the shutter key.

Figure 2:
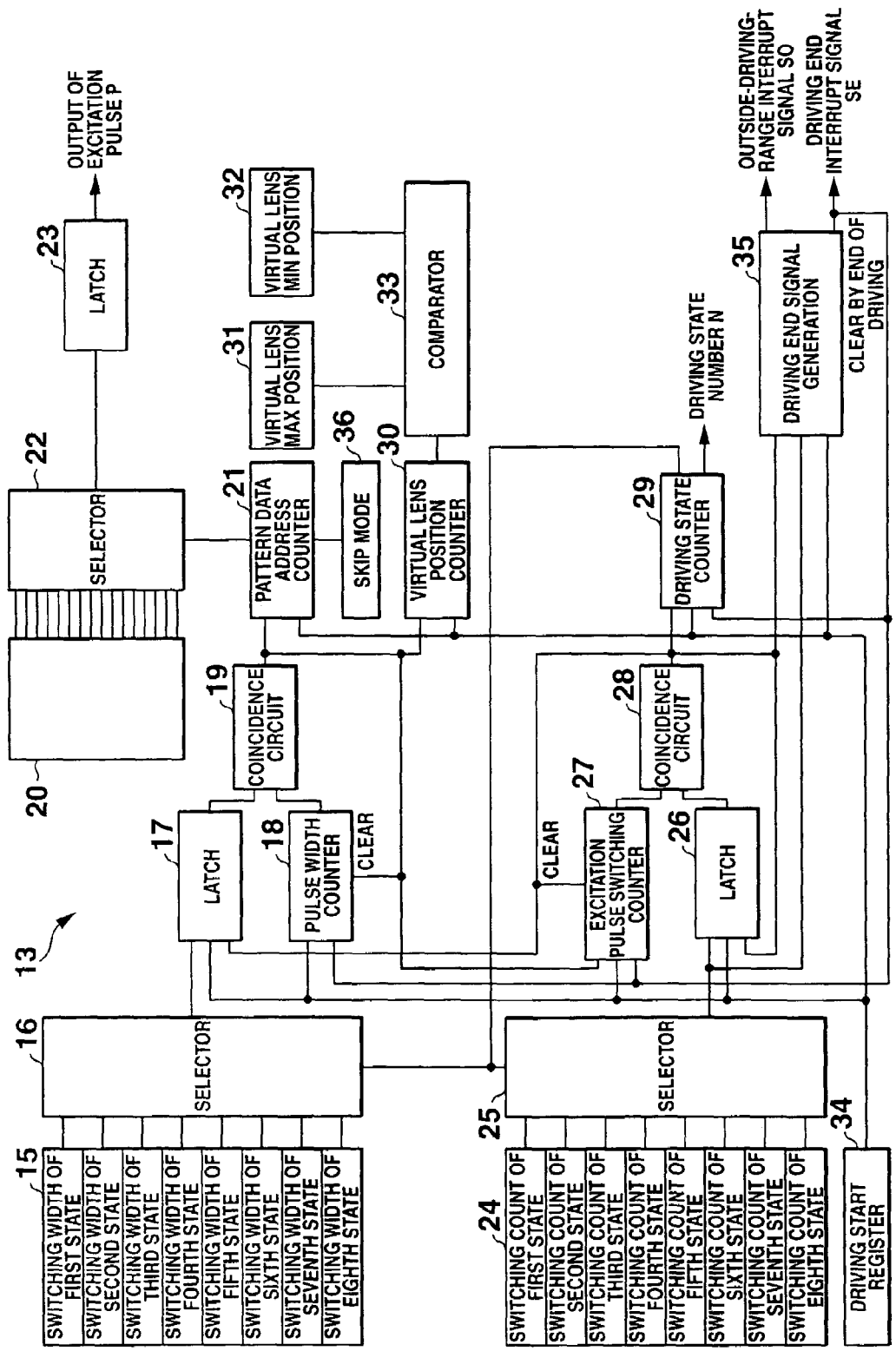
FIG. 2 is a block diagram showing details of a motor controller.

FIG. 2 is a block diagram showing details of the motor controller 13. In FIG. 2, the CPU 2 sets in a pulse width setting register 15 the excitation pulse widths of driving states (switching widths of the first through eighth states) which are divided to drive the stepping motor 14. A selector 16 sequentially selects the excitation pulse widths (switching widths) of the first through eighth states set in the pulse width setting register 15. A latch 17 is a storage element which temporarily stores an excitation pulse width selected and output by the selector 16. A pulse width counter 18 measures the excitation pulse width by using clocks of a predetermined frequency. A coincidence circuit 19 makes a value stored in the latch 17 and the value of the excitation pulse width measured by the pulse width counter 18 coincide with each other.

Excitation pattern data (to be described later) is set by the CPU 2 or stored in advance in a pattern setting register 20. A pattern data address counter 21 generates an address for selecting excitation pattern data at each coincidence timing of the coincidence circuit 19. The CPU 2 sets in a skip mode register 36 the address stepping form (skip count) of the pattern data address counter 21 which selects excitation pattern data. A selector 22 selects excitation pattern data from the pattern setting register 20 at the skip count set in the skip mode register 36 on the basis of an address generated by the pattern data address counter 21. A latch 23 is a storage element which temporarily stores excitation pattern data selected by the selector 22.

The CPU 2 sets the excitation pulse switching counts of the driving states (first through eighth states) in a pulse switching count register 24. A selector 25 sequentially selects the switching counts of the first through eighth states that are set in the pulse switching count register 24. A latch 26 is a storage element which temporarily stores an excitation pulse switching count selected and output by the selector 25. An excitation pulse switching counter 27 measures excitation pattern data every time the data is switched. A coincidence circuit 28 makes an excitation pulse switching count stored in the latch 26 and a switching count measured by the excitation pulse switching counter 27 coincide with each other.

A driving state counter 29 counts the driving state at each coincidence timing of the coincidence circuit 28, and outputs a driving state number N as a count value to the CPU 2. From the driving state number N output from the driving state counter 29, the CPU 2 can recognize that the state has switched to the Nth state. In response to switching of the state, the CPU 2 sets a skip count corresponding to the stepping motor driving method (1-2 phase driving=one skip, 2-2 phase driving=three skips: to be described later) in the skip mode register 36.

A virtual lens position counter 30 counts the virtual position of the lens at each coincidence timing of the coincidence circuit 19. The CPU 2 sets in a maximum value register 31 a maximum value (virtual lens MAX position) when the lens driving range is given by a virtual numerical value. The CPU 2 sets in a minimum value register 32 a minimum value (virtual lens MIN position) when the lens driving range is given by a virtual numerical value. A comparator 33 compares the virtual lens MAX position set in the maximum value register 31, the virtual lens MIN position set in the minimum value register 32, and a value counted by the virtual lens position counter 30. The CPU 2 sets the start of driving the stepping motor 14 in a driving start register 34. A driving end signal generation circuit 35 generates a driving end signal for the stepping motor 14 under the motor driving end condition. The driving end signal generation circuit 35 outputs an outside-driving-range interrupt signal SO and driving end interrupt signal SE to the CPU 2.

Figure 3:
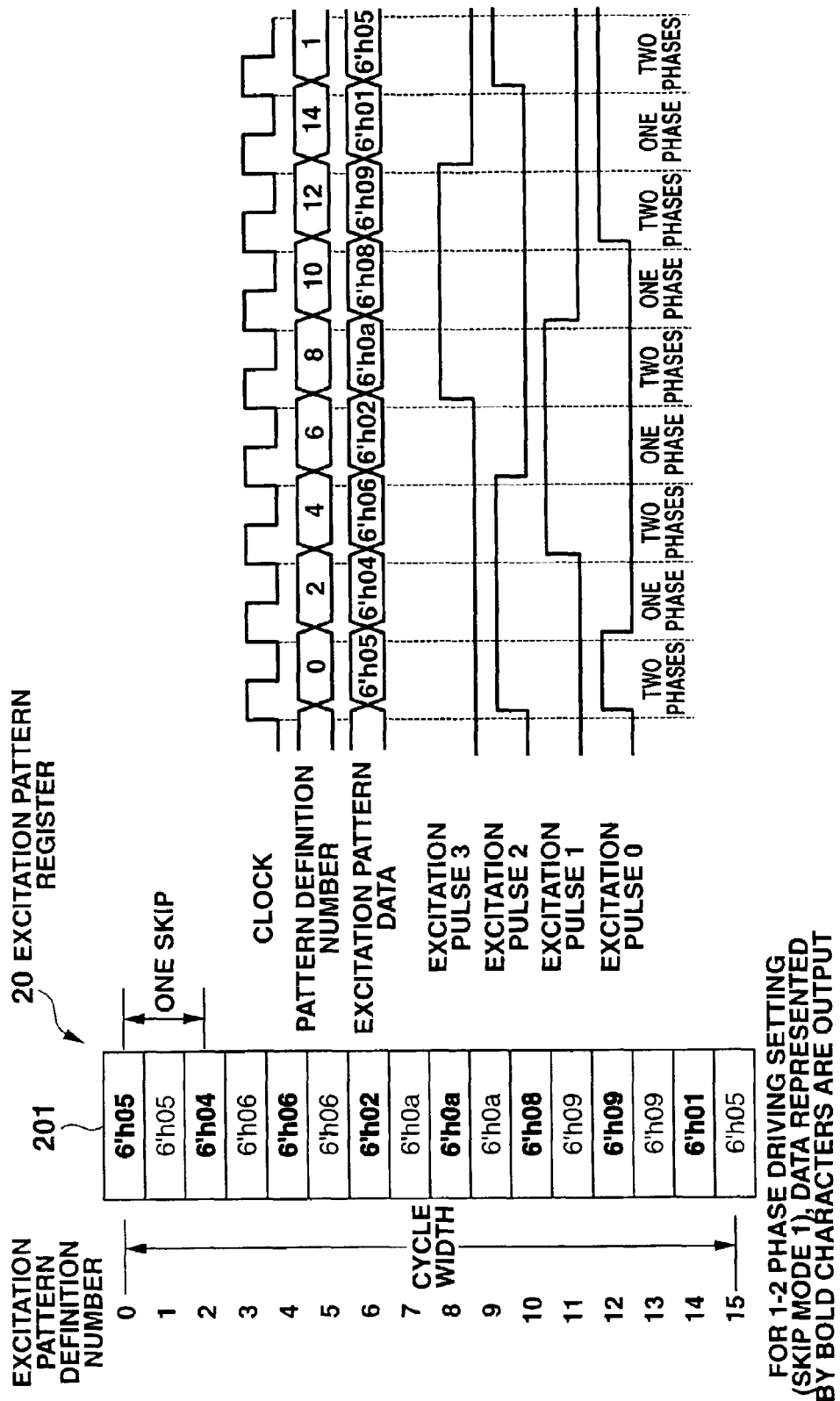
FIG. 3 is a view showing the relationship between the excitation pulse pattern and the waveform of 1-2 phase driving.
Figure 4:
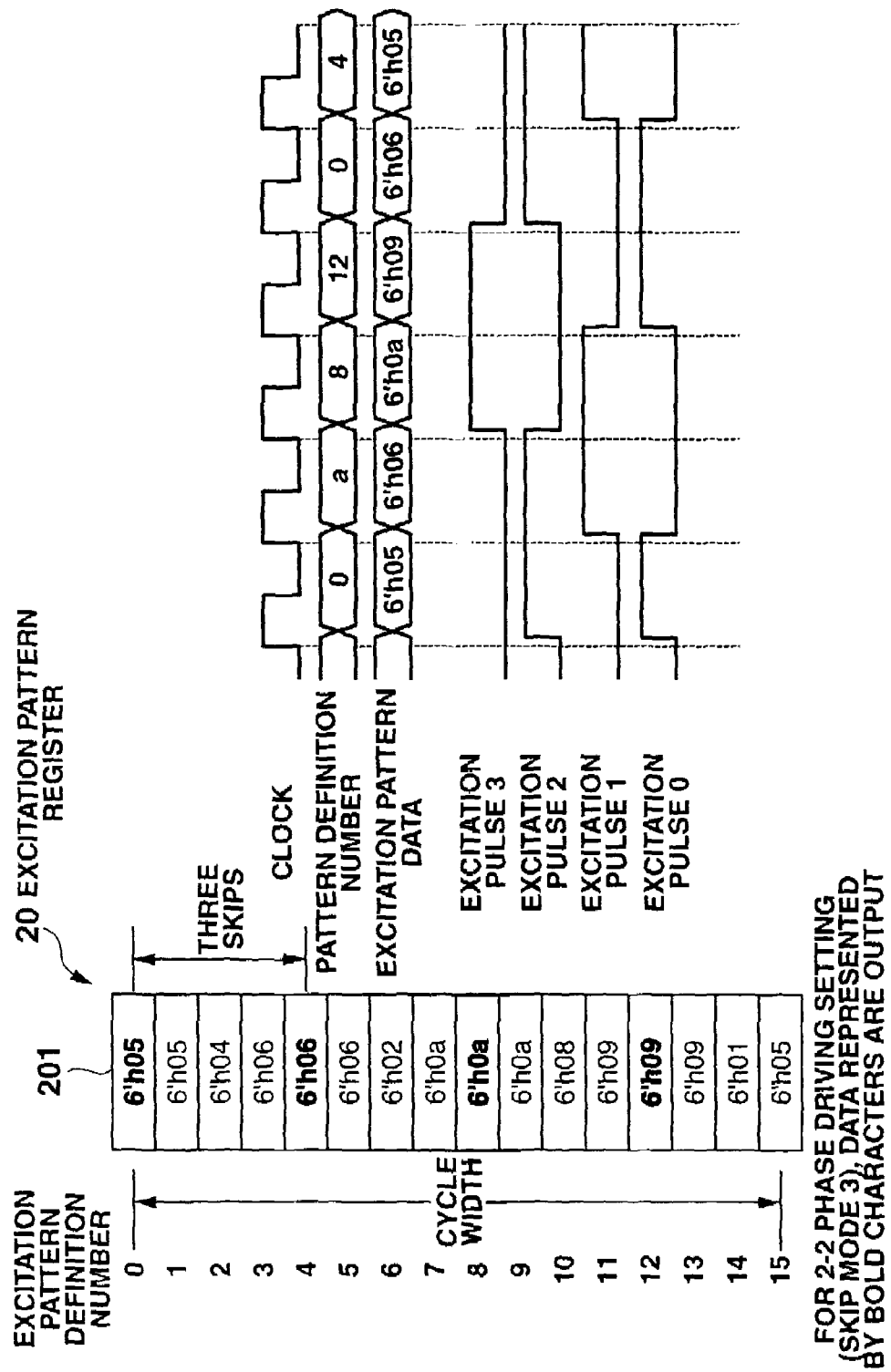
FIG. 4 is a view showing the relationship between the excitation pulse pattern and the waveform of 2-2 phase driving.

FIGS. 3 and 4 show the structure of excitation pattern data stored in the pattern setting register 20. The pattern setting register 20 stores an excitation pattern data group 201 of a plurality of excitation pattern data "6'h05" to "6'h05" for successive excitation pattern definition numbers corresponding to addresses. The excitation pattern data group 201 is formed so that excitation pulses for 1-2 phase driving of the stepping motor 14 having stators 0 through 3 of four phases are output when data are read out every other data at one skip, as shown in FIG. 3, and excitation pulses for 2-2 phase driving are output when data are read out every four data at three skips, as shown in FIG. 4.

Figure 5:
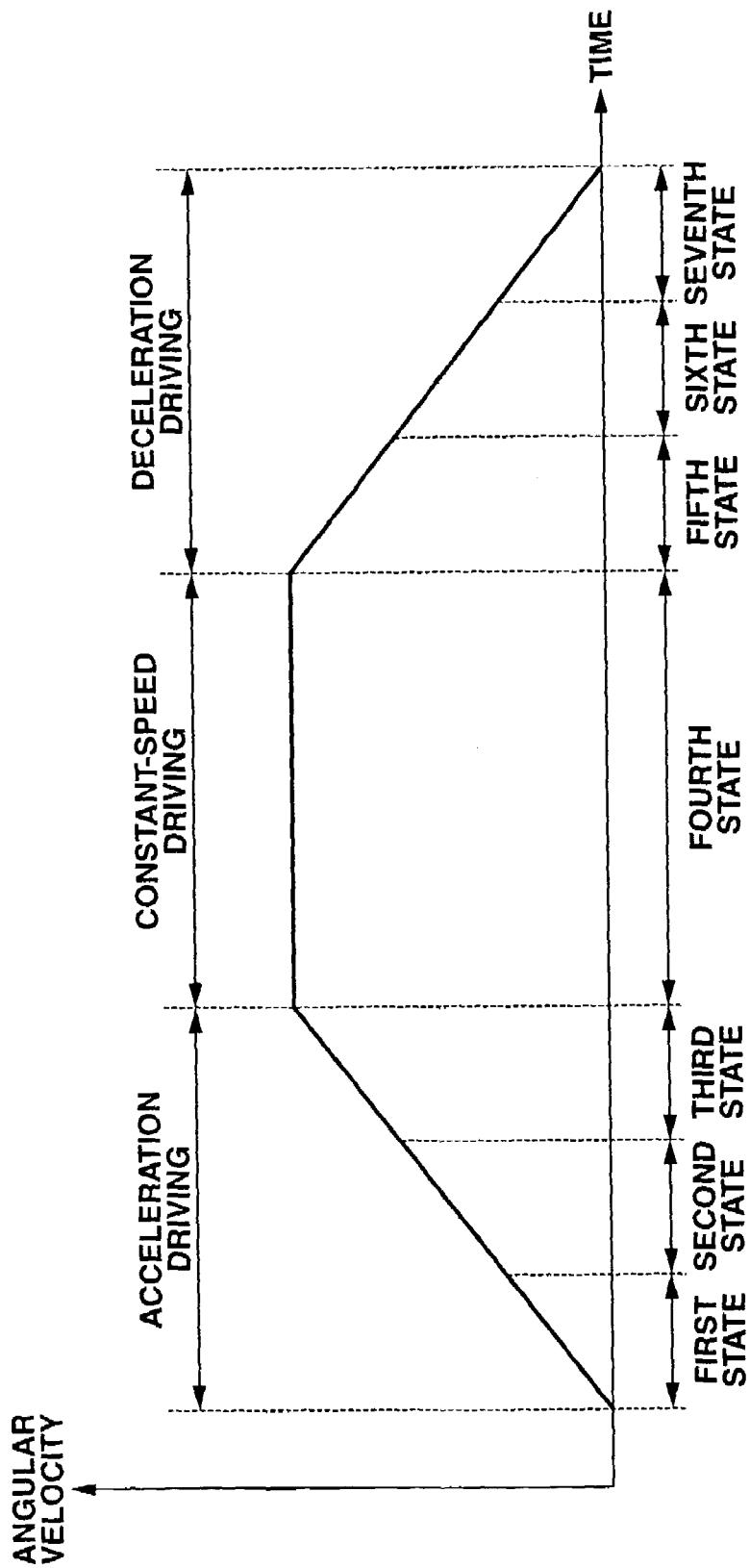
FIG. 5 is a graph showing the relationship between the driving process of a stepping motor and a divided driving state.
Figure 6:
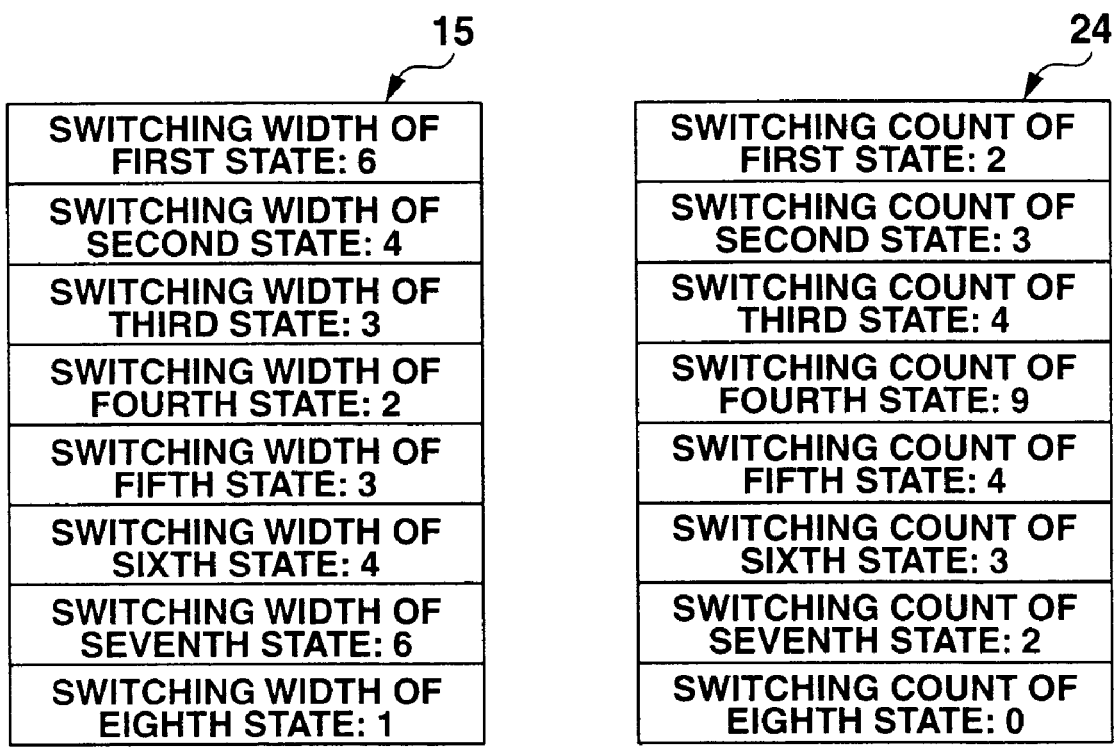
FIGS. 6A and 6B are views, respectively, showing a value set in a pulse width setting register and a value set in a pulse switching count register according to the embodiment.

In the embodiment having the above configuration, for example, when the lens is moved forward to a predetermined position and stopped upon power-on or when the lens is moved backward to a predetermined position and stopped upon power-off, the stepping motor 14 is accelerated and driven→driven at a constant speed→decelerated and driven, and then stopped, as shown in FIG. 5. At this time, the CPU 2 divides acceleration driving into the first through three states, sets constant-speed driving as the fourth state, and divides deceleration driving into the fifth through seventh states, as shown in FIG. 5. Further, the CPU 2 sets switching widths "6", "4", "3", "2", "3", "4", "6", and "1" of the first through eighth states in the pulse width setting register 15, as shown in FIG. 6A. The CPU 2 sets switching counts "2", "3", "4", "9", "4", "3", "2", and "0" of the first through eighth states in the pulse switching count register 24, as shown in FIG. 6B.

After that, the CPU 2 sets the start of driving the stepping motor 14 in the driving start register 34. As shown in the timing chart of FIG. 7, the latch 17 latches switching width data "6" of the current state that is selected by the selector 16. The latch 26 latches switching count data "2" of the current state that is selected by the selector 25. The pulse width counter 18 measures an excitation pulse width by using clocks of a predetermined cycle. Since the switching width of the first state in this example is "6", the pulse width counter 18 clears the count value in the first state every time the count value reaches "6". The excitation pulse switching counter 27 represents an initial value "1" when the start of driving is set in the driving start register 34. Every time the count value of the pulse width counter 18 is cleared, the excitation pulse switching counter 27 counts up the count value.

Figure 7:
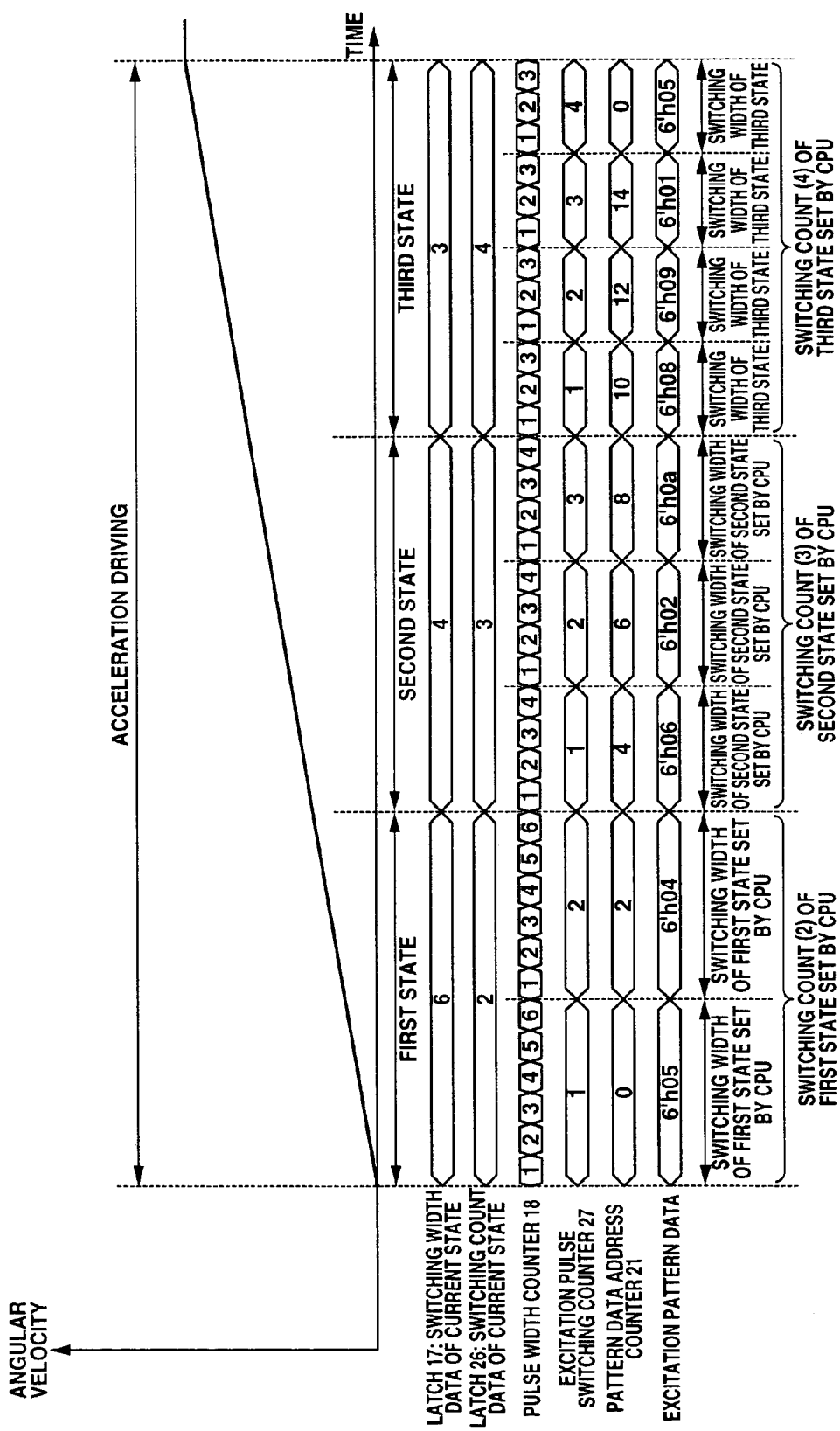
FIG. 7 is a timing chart showing operation in acceleration driving according to the embodiment.

At the start of driving, the CPU 2 sets the excitation pattern data group 201 in the pattern setting register 20. The CPU 2 sets "1" in the skip mode register 36 in order to operate the stepping motor 14 by smooth acceleration according to 1-2 phase driving in acceleration driving. The pattern data address counter 21 generates an address (pattern definition number) for selecting excitation pattern data at an interval of one skip at each coincidence timing of the coincidence circuit 19. Accordingly, as shown in FIG. 7, the pattern data address counter 21 generates a pattern definition number which changes from the initial value "0" to "2", "4", "6", . . . . The selector 22 selects excitation pattern data stored at an address corresponding to the pattern definition number from the pattern setting register 20 on the basis of the pattern definition number generated by the pattern data address counter 21. As shown in FIG. 7, excitation pattern data are selected sequentially from "6'h05", "6'h04", "6'h06", "6'h02", . . . as the pattern definition number changes from "0", "2", "4", "6", . . . .

As described above, the excitation pattern data group 201 is made up of a plurality of excitation pattern data which are so arrayed as to output excitation pulses for 1-2 phase driving of the stepping motor 14 when pattern data are read out every other data at one skip. Thus, excitation pulses 0 through 3 shown in FIG. 3 are applied to the stators (0 through 3) of the stepping motor 14, as shown in FIG. 3. The stepping motor 14 operates by 1-2 phase driving in which one-phase driving and two-phase driving are alternately repeated. The lens operates while being accelerated smoothly.

Figure 8A:
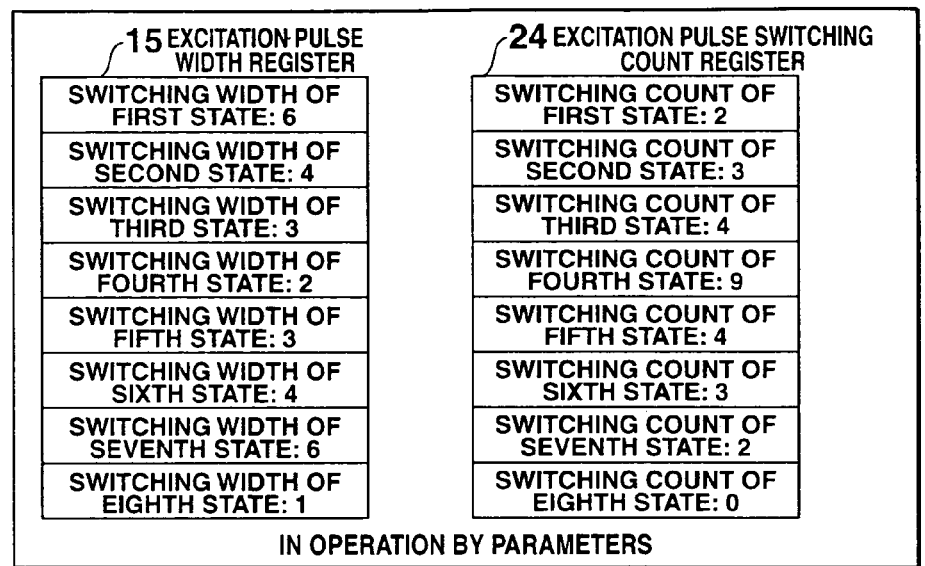
FIG. 8A is a view showing the storage states of the pulse width setting register, pulse switching count register, and pattern setting register.
Figure 8B:
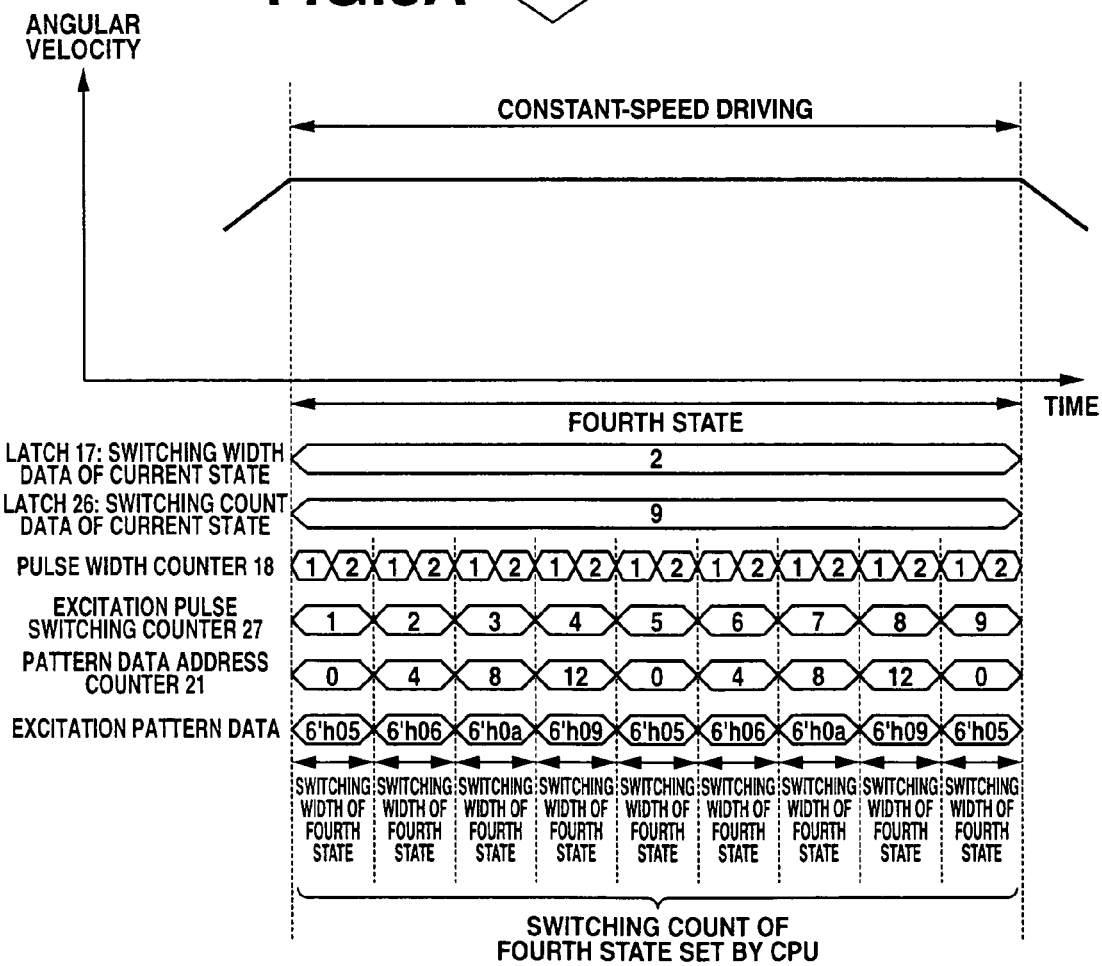
FIG. 8B is a timing chart showing operation in constant-speed driving according to the embodiment.

In shift to the fourth state corresponding to the next constant-speed driving, the value of the driving state counter 29 changes from "3" to "4". The driving state counter 29 outputs the driving state number N=4 to the CPU 2. The fourth state corresponding to constant-speed driving has the switching width "2" and the switching count "9", as shown in FIG. 8A. When the value of the pulse width counter 18 reaches "2", as shown in FIG. 8B, the excitation pulse switching counter 27 changes from "1"→"2"→"3" ... "9".

Upon reception of the driving state number N=4 from the driving state counter 29, the CPU 2 recognizes that the stepping motor 14 is to be driven at a constant speed. The CPU 2 sets "3" in the skip mode register 36 so as to operate the stepping motor 14 in a stable state by the 2-2 phase in constant-speed driving. The pattern data address counter 21 generates an address (pattern definition number) for selecting excitation pattern data at an interval of three skips at each coincidence timing of the coincidence circuit 19. As a result, as shown in FIG. 8B, the pattern data address counter 21 generates a pattern definition number which changes from "0", "4", "8", "12", . . . . The selector 22 selects excitation pattern data stored at an address corresponding to the pattern definition number from the pattern setting register 20 on the basis of the pattern definition number generated by the pattern data address counter 21. As shown in FIG. 8B, excitation pattern data are selected sequentially from "6'h05", "6'h06", "6'h0a", "6'h09", . . . as the pattern definition number changes from "0", "4", "8", "12", . . . .

As described above, the excitation pattern data group 201 is made up of a plurality of excitation pattern data which are so arrayed as to output excitation pulses for 2-2 phase driving of the stepping motor 14 when pattern data are read out every four data at three skips. Thus, excitation pulses 0 through 3 shown in FIG. 4 are applied to the stators (0 through 3) of the stepping motor 14, as shown in FIG. 4. The stepping motor 14 operates by 2-2 phase driving in which excitation pulses are applied to the stators for two phases. The lens operates at a stable speed.

Figure 9:
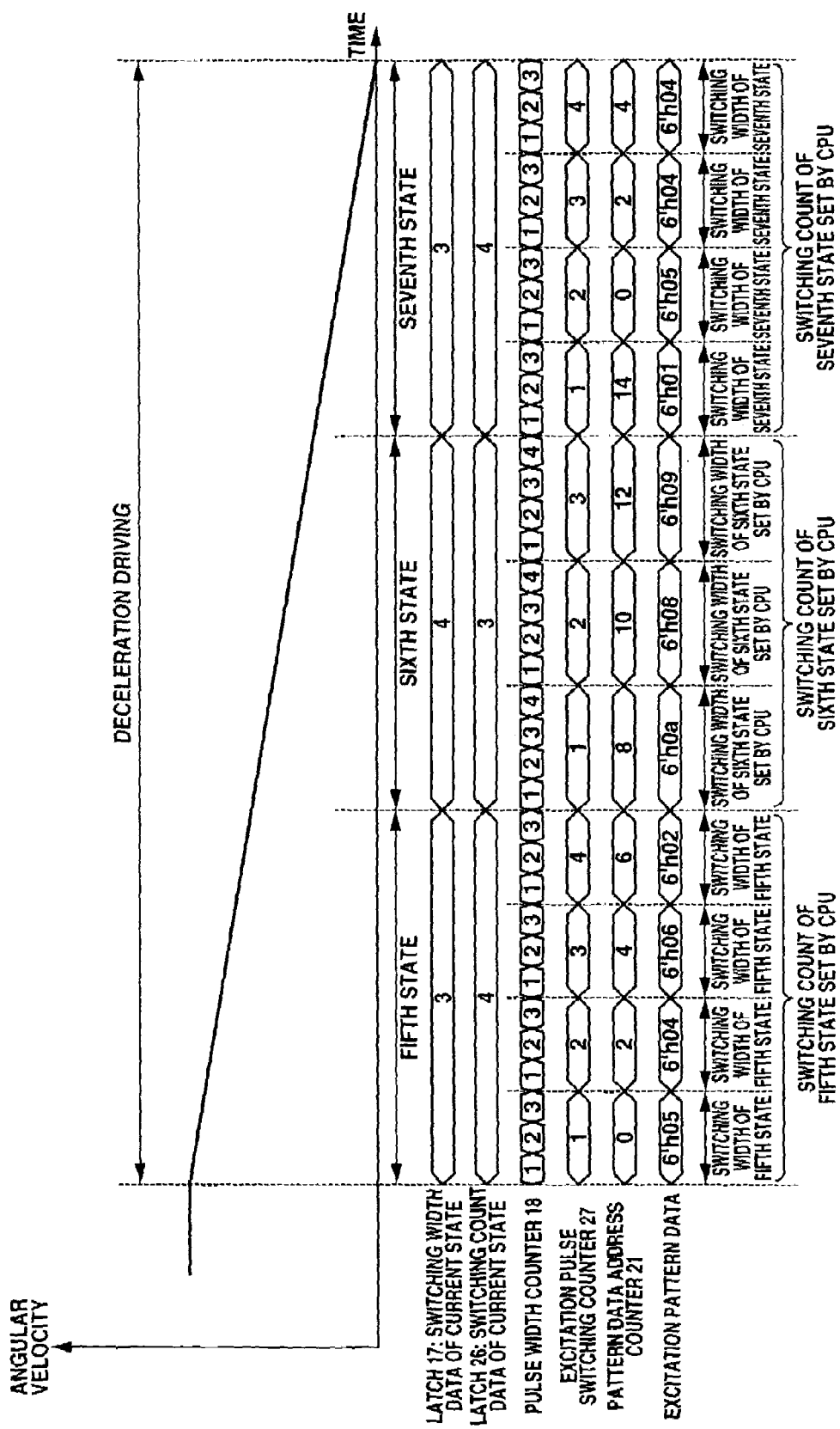
FIG. 9 is a timing chart showing operation in deceleration driving according to the embodiment.

Of the fifth to seventh states corresponding to deceleration driving, the fifth state serving as the start state has the switching width "3" and the switching count "4". When the value of the pulse width counter 18 reaches "3", as shown in FIG. 9, the excitation pulse switching counter 27 changes from "1"→"2"→"3"→"4". In deceleration driving, similar to acceleration driving, the CPU 2 sets "1" in the skip mode register 36 so as to operate the stepping motor 14 by smooth deceleration using the 1-2 phase. The pattern data address counter 21 generates an address (pattern definition number) for selecting excitation pattern data at an interval of one skip at each coincidence timing of the coincidence circuit 19. Accordingly, as shown in FIG. 9, the pattern data address counter 21 generates a pattern definition number which changes from the initial value "0" to "2", "4", "6", . . . . The selector 22 selects excitation pattern data stored at an address corresponding to the pattern definition number from the pattern setting register 20 on the basis of the pattern definition number generated by the pattern data address counter 21. As shown in FIG. 9, excitation pattern data are selected sequentially from "6'h05", "6'h04", "6'h06", "6'h02", . . . as the pattern definition number changes from "0", "2", "4", "6", . . . .

As described above, the excitation pattern data group 201 is made up of a plurality of excitation pattern data which are so arrayed as to output excitation pulses for 1-2 phase driving of the stepping motor 14 when pattern data are read out every other data at one skip. Excitation pulses 0 through 3 shown in FIG. 3 are applied to the stators (0 through 3) of the stepping motor 14, as shown in FIG. 3. The stepping motor 14 operates by 1-2 phase driving in which one-phase driving and two-phase driving are alternately repeated. The lens operates while being decelerated smoothly.

In shift to the fifth state corresponding to the next deceleration driving, the value of the driving state counter 29 changes from "4" to "5". The driving state counter 29 outputs the driving state number N=5 to the CPU 2. Upon reception of the driving state number N=5 from the driving state counter 29, the CPU 2 recognizes that the stepping motor 14 is to be decelerated and driven. The CPU 2 sets "1" in the skip mode register 36 so as to operate the stepping motor 14 smoothly by the 1-2 phase in deceleration driving.

Also in the sixth state having the switching width "4" and the switching count "3" and the seventh state, the stepping motor 14 operates by 1-2 phase driving. The eighth state subsequent to the seventh state has the switching width 11111 and the switching count "0". Hence, even if the value of the pulse width counter 18 changes to "1", the excitation pulse switching counter 27 and pattern data address counter 21 do not change. The excitation output pulse P stops, and the stepping motor 14 also stops. The driving end signal generation circuit 35 generates a driving end interrupt signal, and outputs it to the CPU 2. In response to the signal, the CPU 2 also stops the motor controller 13.

As described above, at the start of driving the stepping motor 14, the CPU 2 sets the switching widths of the first through eighth states in the pulse width setting register 15, sets the switching counts of the first through eighth states in the pulse switching count register 24, sets excitation pattern data in the pattern setting register 20, and sets the start of driving the stepping motor 14 in the driving start register 34. With these settings, the stepping motor 14 is accelerated, driven at a constant speed, decelerated, and stopped. The CPU 2 sets "1" in the skip mode register 36 for acceleration driving and deceleration driving and "3" for constant-speed driving. The stepping motor 14 is driven by 1-2 phase driving in acceleration driving and deceleration driving, and 2-2 phase driving in constant-speed driving. The CPU 2 suffices to control the motor controller 13 in only switching the driving form, and need not control the motor controller 13 after switching. The process burden on the CPU 2 does not increase.

Tables for the 1-2 phase driving method and 2-2 phase driving method need not be stored in a memory such as the pattern setting register 20, and excitation pattern data of each driving method need not be stored in a corresponding table. Only the excitation pattern data group 201 suffices to be stored, and a necessary storage capacity can be reduced. Excitation pattern data is selected from the pattern setting register 20 serving as one storage means intermittently at a skip count corresponding to a designated driving method. This simplifies an address change in selecting excitation pattern data, and excitation pattern data can be selected by simple address control.

As described above, in accelerating, driving at a constant speed, and decelerating the lens, the CPU 2 sets in advance in the maximum value register 31 a maximum value (virtual lens MAX position) when the lens driving range is given by a virtual numerical value. The CPU 2 sets in advance in the minimum value register 32 a minimum value (virtual lens MIN position) when the lens driving range is given by a virtual numerical value. The virtual lens position counter 30 counts the virtual position of the lens at each coincidence timing of the coincidence circuit 19, and outputs the count value to the comparator 33. The comparator 33 compares the virtual lens MAX position set in the maximum value register 31, the virtual lens MIN position set in the minimum value register 32, and the value counted by the virtual lens position counter 30. When the value counted by the virtual lens position counter 30 reaches the virtual lens MAX position set in the maximum value register 31 or the virtual lens MIN position set in the minimum value register 32, the comparator 33 outputs a signal to the driving end signal generation circuit 35. The driving end signal generation circuit 35 generates an outside-driving-range interrupt signal and outputs it to the CPU 2, and the CPU 2 stops the motor controller 13. Since the motor controller 13 stops, the stepping motor 14 also stops, and the lens driven by the stepping motor 14 stops within the virtual lens MAX position or virtual lens MIN position. This can prevent a so-called lens stuck phenomenon in which excessive movement of the lens makes re-driving difficult.

In the embodiment, the CPU 2 sets the skip count in the skip mode register 36, and the selector 22 selects an excitation pattern from the excitation pattern data group 201 at an interval corresponding to the skip count. Alternatively, the CPU 2 may sequentially designate the addresses of excitation patterns to be selected, and the selector 22 may intermittently select the excitation patterns in accordance with the address designation. In this case, the CPU 2 is steadily involved in the process of selecting an excitation pattern. However, tables for the 1-2 phase driving method and 2-2 phase driving method need not be stored in a memory such as the pattern setting register 20, and excitation pattern data of each driving method need not be stored in a corresponding table. For this reason, a necessary storage capacity can be reduced. Excitation pattern data is selected from the pattern setting register 20 serving as one storage means. This simplifies an address change in selecting excitation pattern data, and excitation pattern data can be selected by simple address control.

In the embodiment, the driving state counter 29 outputs the driving state number N to the CPU 2. The CPU 2 sets a skip count corresponding to the stepping motor driving method (1-2 phase driving=one skip, 2-2 phase driving=three skips) in the skip mode register 36 in accordance with the driving state number N output from the driving state counter 29. Alternatively, a circuit which sets a skip count corresponding to the driving state number N in the skip mode register 36 may be arranged in the motor controller 13. This arrangement can completely eliminate the intervention of the CPU 2 in switching of the driving method, and the process burden on the CPU 2 can be further reduced.

What is claimed is:

1. A stepping motor control circuit comprising:
a switching width memory configured to divide a driving process of a stepping motor into a plurality of driving states, and to store switching widths of an excitation pulse that are set for the divided driving states;
a switching count memory configured to store switching counts of the excitation pulse that are set for the divided driving states;
a pattern data memory configured to store a plurality of pattern data of the excitation pulse;
a counter configured to perform a counting operation based on a clock signal of a predetermined cycle;
a switching unit configured to perform a switching operation based on a count value obtained by the counting operation of the counter in response to a driving start instruction and in accordance with the switching widths stored in the switching width memory and the switching counts stored in the switching count memory;
a selector configured to sequentially select the pattern data stored in the pattern data memory in synchronism with the switching operation of the switching unit; and
an output unit configured to output the excitation pulse to the stepping motor in accordance with the pattern data selected by the selector.

2. A circuit according to claim 1, wherein:
the pattern data memory stores pattern data in correspondence with different addresses;
the switching unit changes and outputs an address value during the switching operation; and
the selector sequentially selects the pattern data corresponding to outputted address values.

3. A circuit according to claim 1, wherein:
the pattern data memory stores a plurality of excitation pattern data for driving the stepping motor by different driving methods by being intermittently selected at different intervals corresponding to the driving methods; and
the selector intermittently selects, at intervals corresponding to designated driving methods, the excitation pattern data stored in the pattern data memory.

4. A circuit according to claim 1, wherein the stepping motor is provided to drive a lens of a camera.

5. A stepping motor control circuit comprising:
a switching width memory configured to divide a driving process of a stepping motor into a plurality of driving states, and to store switching widths of an excitation pulse that are set for the divided driving states;
a switching count memory configured to store switching counts of the excitation pulse that are set for the divided driving states;
a pattern data memory configured to store a plurality of pattern data of the excitation pulse;
a selector configured to sequentially select the pattern data stored in the pattern data memory, in response to a driving start instruction and in accordance with the switching widths stored in the switching width memory and the switching counts stored in the switching count memory;
an output unit configured to output the excitation pulse to the stepping motor in accordance with the pattern data selected by the selector;
a virtual value memory configured to store a maximum value and a minimum value when a driving range of an object to be driven by the stepping motor is given by a virtual numerical value;
a measurement unit configured to measure a virtual position of the object to be driven based on a control content for outputting the excitation pulse to the stepping motor;
a comparison unit configured to compare the virtual position of the object to be driven that is measured by the measurement unit with the maximum value and the minimum value that are stored in the virtual value memory; and an output stop control unit configured to stop output of the excitation pulse in accordance with a comparison result of the comparison unit.

6. A stepping motor control circuit comprising:

a pattern data memory configured to store a plurality of excitation pattern data for driving a stepping motor by different driving methods by being intermittently selected at different intervals;

a selector configured to intermittently select, at intervals corresponding to designated driving methods, the excitation pattern data stored in the pattern data memory; and an output unit configured to output an excitation pulse to the stepping motor in accordance with the excitation pattern data selected by the selector;

wherein the different driving methods include a 1-2 phase driving method and a 2-2 phase driving method.

7. A circuit according to claim 6, further comprising a setting unit configured to set values corresponding to the driving methods, including the 1-2 phase driving method and the 2-2 phase driving method;

wherein the selector intermittently selects, at intervals represented by the values set in the setting unit, the excitation pattern data stored in the pattern data memory, to intermittently select excitation pattern data corresponding to any of the driving methods.

8. A circuit according to claim 6, further comprising;

a switching width memory configured to divide a driving process of the stepping motor into a plurality of driving states, and to store switching widths of the excitation pulse that are set for the divided driving states; and a switching count memory configured to store switching counts of the excitation pulse that are set for the divided driving states;

wherein the selector intermittently selects the pattern data stored in the pattern data memory, at intervals corresponding to the designated driving methods, in response to a driving start instruction and in accordance with the switching widths stored in the switching width memory and the switching counts stored in the switching count memory.

9. A circuit according to claim 6, wherein the selector intermittently selects the pattern data at intervals corresponding to driving methods designated by a controller.

10. A stepping motor control circuit comprising:

a pattern data memory configured to store a plurality of excitation pattern data for driving a stepping motor by different driving methods by being intermittently selected at different intervals;

a selector configured to intermittently select, at intervals corresponding to designated driving methods, the excitation pattern data stored in the pattern data memory; and an output unit configured to output an excitation pulse to the stepping motor in accordance with the excitation pattern data selected by the selector;

a virtual value memory configured to store a maximum value and a minimum value when a driving range of an object to be driven by the stepping motor is given by a virtual numerical value;

a measurement unit configured to measure a virtual position of the object to be driven based on a control content for outputting the excitation pulse to the stepping motor;

a comparison unit configured to compare the virtual position of the object to be driven that is measured by the measurement unit with the maximum value and the minimum value that are stored in the virtual value memory; and an output stop control unit configured to stop output of the excitation pulse in accordance with a comparison result of the comparison unit.

11. A stepping motor control circuit comprising:

a switching width memory configured to divide a driving process of a stepping motor into a plurality of driving states, and to store switching widths of an excitation pulse that are set for the divided driving states;

a pattern data memory configured to store a plurality of pattern data of the excitation pulse;

a state counter configured to count the driving states during driving of the stepping motor;

a selector configured to sequentially select the pattern data stored in the pattern data memory, based on a driving state number output from the state counter, in accordance with the switching widths stored in the switching width memory;

an output unit configured to output the excitation pulse to the stepping motor in accordance with the pattern data selected by the selector; and a switching count memory configured to store switching counts of the excitation pulse that are set for the divided driving states;

wherein the state counter counts the driving states in accordance with the switching widths stored in the switching width memory and the switching counts stored in the switching count memory, and outputs the driving state number as a count value.

12. A stepping motor control circuit comprising:

a pattern data memory configured to store a plurality of excitation states and an order of shifting the excitation states;

a switching width memory configured to store a time width for which an excitation state is maintained;

a switching count memory configured to store a number of times one of the plurality of excitation states is shifted; and a control unit configured to maintain a state in which an excitation pulse corresponding to one of the plurality of excitation states is output, for the corresponding time width stored in the switching width memory, and then to repeat, for the number of times stored in the switching count memory, a driving operation in which an excitation pulse corresponding to an excitation state subsequent to said one of the plurality of excitation states is output;

wherein the switching width memory divides a driving process of the stepping motor into a plurality of driving states, and stores the time widths, which are set for the divided driving states;

wherein the switching count memory stores the number of times one of the plurality of excitation states is shifted with respect to each of the divided driving states; and wherein the control unit performs the driving operation based on one of the plurality of driving states in accordance with the time width stored in the switching width memory and the number of times stored in the switching count memory for the driving state, and then repeats the driving operation based on a driving state subsequent to said one of the plurality of driving states, in accordance with the time width stored in the switching width memory and the number of times stored in the switching count memory for the subsequent driving state, from a first one of the plurality of driving states to a last one thereof.

13. A stepping motor control method comprising:
dividing a driving process of a stepping motor into a plurality of driving states, and storing in a memory switching widths of an excitation pulse that are set for the divided driving states;
storing in the memory switching counts of the excitation pulse that are set for the divided driving states;
storing a plurality of pattern data of the excitation pulse in a pattern data memory;
performing a switching operation based on a count value obtained by a counting operation that is based on a clock signal of a predetermined cycle, in response to a driving start instruction, and in accordance with the switching widths and switching counts stored in the memory;
sequentially selecting the pattern data stored in the pattern data memory in synchronism with the switching operation; and
outputting the excitation pulse to the stepping motor in accordance with the selected pattern data.

14. A stepping motor control method for controlling a stepping motor control circuit which comprises (i) a pattern data memory configured to store a plurality of excitation states and an order of shifting the excitation states, (ii) a switching width memory configured to divide a driving process of the stepping motor into a plurality of driving states, and to store a time width by which an excitation state is maintained with respect to each of the divided driving states, and (iii) a switching count memory configured to store a number of times one of the plurality of excitation states is shifted with respect to each of the divided driving states, the stepping motor control method comprising:
(a) setting a first driving state;
(b) outputting an excitation pulse corresponding to one of the plurality of excitation states stored in the pattern data memory;
(c) maintaining a state in which the excitation pulse is output, for the time width which is stored in the switching width memory with respect to the set first driving state;
(d) outputting an excitation pulse corresponding to an excitation state subsequent to said one of the plurality of excitation states, after the state in which the excitation pulse is output is maintained for the time width;
(e) repeating steps (b) to (d) as a series of operations, in accordance with a number of times stored in the switching count memory with respect to the set first driving state;
(f) setting a driving state subsequent to the set first driving state; and
(g) repeating steps (b) to (f) as a series of operations, until the subsequent driving state set in step (f) is a last one of the driving states.

* * * * *